Nov. 4, 1958     E. GREENWOOD ET AL     2,858,982
REMOTE INDICATING REGISTER FOR METERS
Filed Feb. 3, 1954     4 Sheets-Sheet 1

INVENTORS
Earle Greenwood,
Frederick C. Holtz,
Elmer L. Meinders,
By Brown, Jackson, Boettcher & Dienner
attys Nov. 4, 1958  E. GREENWOOD ET AL  2,858,982
REMOTE INDICATING REGISTER FOR METERS
Filed Feb. 3, 1954  4 Sheets-Sheet 2

United States Patent Office 2,858,982
Patented Nov. 4, 1958

2,858,982
REMOTE INDICATING REGISTER FOR METERS

Earle Greenwood, Frederick C. Holtz, and Elmer L. Meinders, Springfield, Ill., assignors to Sangamo Electric Company, Springfield, Ill., a corporation of Illinois Application February 3, 1954, Serial No. 407,834

12 Claims. (Cl. 235—91)

The present invention relates to improvements in remote indicating registers for gas or other types of meters.

The invention has particular application to gas meters and other domestic meters which are customarily located in the basements of residences, or otherwise located indoors of the building being served by the meter. This indoor location is desirable or essential in localities subject to wide temperature changes or freezing weather, where it is not practicable to locate a gas meter or a water meter in an outdoor location.

The indoor location of such meters has long presented meter reading problems of real magnitude to the public utility companies, because of the numerous instances when the meter reader is unable to obtain access to the meter, owing to the fact that there is no one at home. There has been long-felt want for a satisfactory remote indicating register which will enable the meter reader to make a meter reading at a point outside of the house or building, and several types and constructions of remote indicating registers have been heretofore proposed. The requirements of a satisfactory design of remote indicating register are rather exacting, however, and these prior devices with which we are familiar have not been entirely satisfactory for one reason or another. For example, the device must have a high degree of accuracy and reliability of performance; it should not require servicing; it should not be dependent upon an electric light or power circuit for a source of operating energy; it should have a high degree of safety, particularly for use with gas meters; and its construction should be sufficiently simple and inexpensive that the cost of the device and its installation does not more than offset the cost of repeated visits of a meter reader to a residence for obtaining access to the meter.

Our improved apparatus herein disclosed operates upon the fluid impulse transmission principle, wherein the indoor meter and the outdoor indicator are connected by a small conduit through which fluid impulses are transmitted from the meter to the indicator. This general type of apparatus is disclosed in Patent No. 2,633,296, issued March 31, 1953, to Raymond J. Dufour, on "Remote Meter Registration Device," reissued March 16, 1954, as Reissue 23,800. Our invention herein disclosed embodies improved features and modifications of the general type of apparatus disclosed in this Dufour patent.

One of the objects of our invention is to provide improved diaphragm types of pulse transmitting and pulse receiving chambers at the meter and at the indicator respectively, whereby the fluid system between the two is hermetically sealed at both ends. In the apparatus disclosed in the Dufour patent, the fluid medium through which the impulses are transmitted from the meter to the indicator consists of a body or column of the illuminating gas itself contained within the pulse transmitting system. The apparatus of our invention also contemplates the use of the illuminating gas as the pulse transmitting column or medium. When using the illuminating gas as the pulse transmitting medium, the feature of the hermetically sealed system, obtained by using diaphragm chambers at both ends of the system, is quite important from the standpoint of preventing leaks.

In this same regard, another object of the invention is to provide improved remote indicating apparatus of this general type employing atmospheric air as the pulse transmitting medium. This use of air as the pulse transmitting medium may be preferable over the use of gas in some situations. For example, for facility of installation, the preferred form of conduit extending from the meter to the outside indicator is flexible tubing, such as copper tubing, which is more susceptible to mechanical injury than the iron or steel pipe which usually conducts the gas to and from the meter itself. Such mechanical injury to copper tubing may arise from falling objects, or from being struck by indoor trucks, moving doors, and from other accidental causes. Hence, there may be objections in some situations to conducting the combustible gas from the indoor gas meter to an outdoor indicator through a length of this copper tubing or like flexible conduit, which objections are avoided by the use of air as the pulse transmitting medium. In such use of air as the pulse transmitting medium in gas telemetering systems, the feature of a hermetically sealed diaphragm chamber as the pulse transmitter, located within the gas meter, is quite important because it eliminates the possibility of combustible gas leaking from the gas meter into the pulse transmitter.

Furthermore, by using air as the pulse transmitting medium, our apparatus can be employed on water meters and other meters where gas is not available.

Another object of our invention is to provide an improved construction and arrangement of motion transmitting mechanism at the transmitter for taking operating energy from the moving parts of the gas meter and utilizing it to cause an abrupt pulsing movement of the transmitter diaphragm upon each passage of a predetermined quantity of gas through the meter, say for transmitting one pulse, either through the gas column or through the air column, upon the passage of 100 cubic feet of gas through the meter.

Still another object of the invention is to provide an improved construction and arrangement of pulse transmitting unit which can be mounted with a minimum of expense and inconvenience within the rather cramped space available in the gallery chamber of existing gas meters of conventional design. In these installation situations, the transmitter unit must clear the flag arms, flag links, inlet channel, etc. which are all disposed in the gallery chamber. This installation capability is important because it enables the indicating system to be applied to a large number of existing gas meters of conventional design, at minimum installation expense.

Still a further object of the invention is to provide an improved motion transmitting mechanism in the outdoor indicator or index instrument for imparting advancing movement from the pulse receiving diaphragm of such outdoor indicator to the index counters of such instrument.

Other objects, features and advantages of the invention will appear from the following detail description of two preferred embodiments thereof. In the accompanying drawings illustrating such embodiments:

Figure 2 is a vertical sectional view through the pulse 2,858,982

3 transmitter, taken approximately on the plane of the line 2—2 of Figure 1;

Figures 1, 1A:
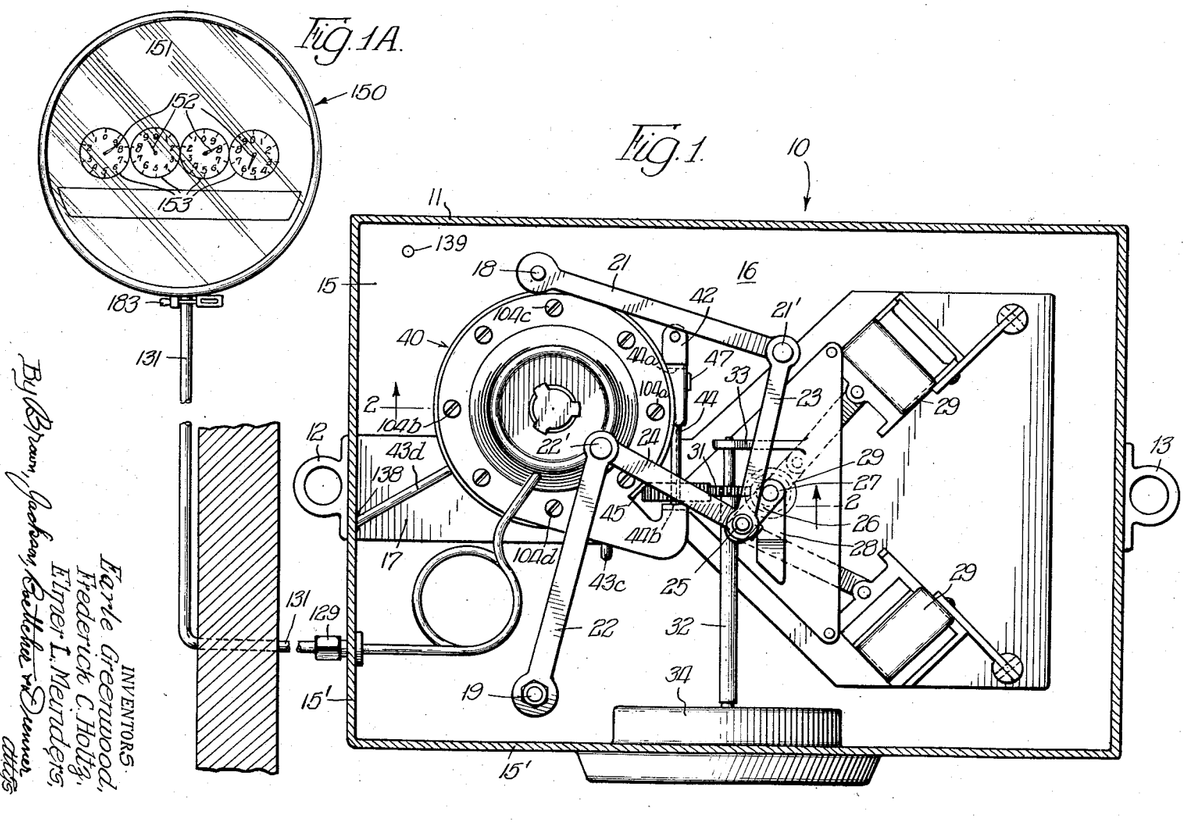
Figure 1 is a top or plan view of a conventional tin type of gas meter with the top removed, showing our improved pulse transmitter mounted in the upper gallery chamber of the meter.
Figure 1A diagrammatically illustrates the external pulse transmitting conduit leading from the pulse transmitter to the indicating register on the outside of the building.
Figure 2:
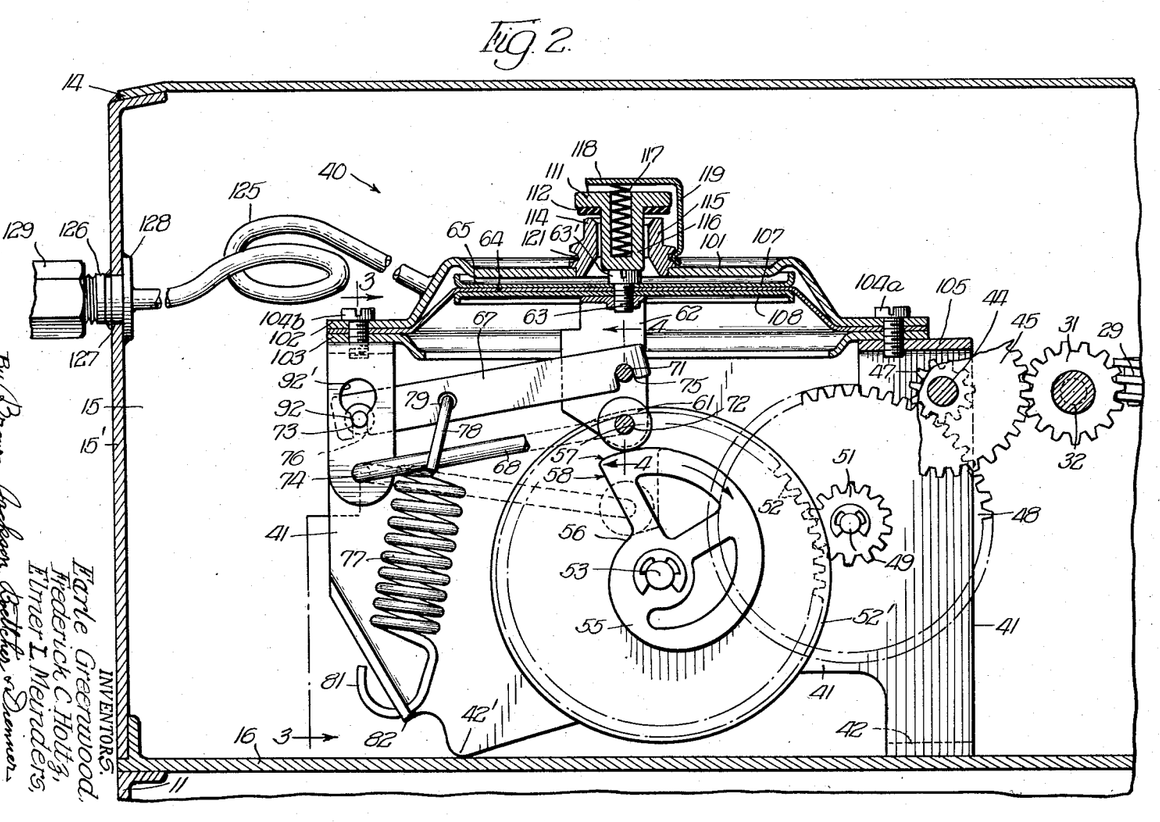
Figures 3, 4:
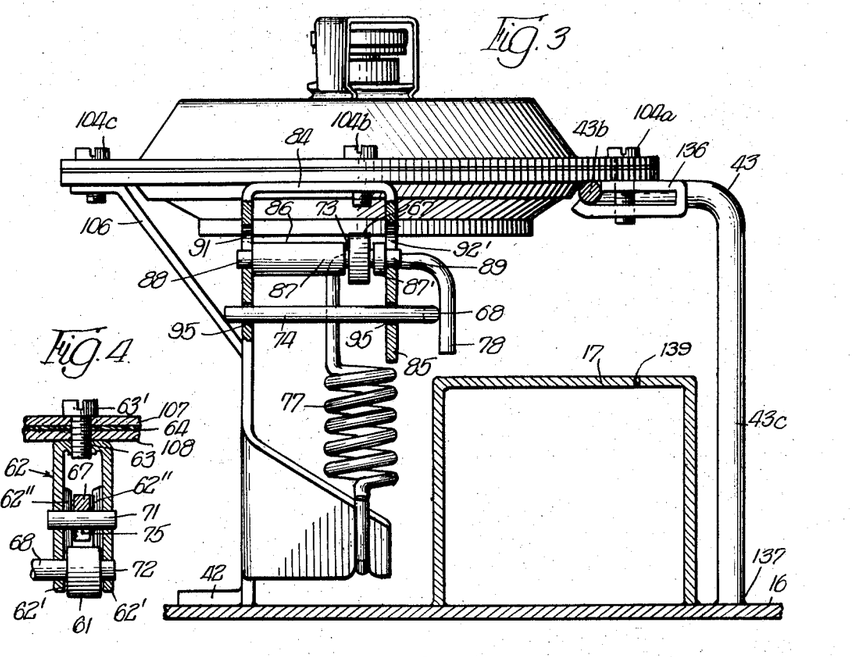
Figure 3 is a transverse view of the pulse transmitter, partly in section and partly in elevation, as represented by the plane of the line 3—3 of Figure 2.
Figure 4 is a detail sectional view of the pulse transmitter, taken approximately on the plane of the line 4—4 of Figure 2.

We have shown our remote registration apparatus as used with a gas meter 10 (Figure 1) of any conventional type, typically illustrated by a Glover tin type of meter. Such a meter usually has a box-like casing 11 provided with gas inlet and outlet conduit connections 12 and 13 communicating with the measuring mechanism enclosed within the box-like casing. As shown in Figure 2, the gas meter comprises a removable top 14 which is usually soldered, or otherwise secured to the casing body to provide an enclosed upper space 15 defined within the side walls 15'. This enclosed upper space 15 is separated from the measuring bellows (not shown) by a horizontal separating wall or partition 16. Such upper deck area 15 is frequently referred to as the gallery chamber, and the partition 16 as the gallery table. This type of meter is usually provided with an inlet channel 17 extending from the gas inlet conduit 12 to the measuring bellows, such inlet channel lying partly or entirely above the level of the gallery table, as shown in Figure 3. The measuring bellows of the meter are operatively connected to oscillate a pair of vertical shafts or flag rods 18 and 19 passing upwardly through the gallery table 16 into the gallery chamber 15. Through the operation of conventional well known apparatus, the movement of the measuring bellows, in response to the flow of gas from the supply pipe 12 to the service pipe 13, causes these two flag shafts 18 and 19 to be oscillated back and forth at rates proportional to the rate of gas flow. Mounted on the upper ends of the flag shafts 18 and 19 to oscillate therewith are flag arms 21 and 22 which have their oscillating ends pivotally connected at 21' and 22' with links 23 and 24. These links have their other ends pivotally connected to a wrist pin 25 extending upwardly from a revolving crank 26. This crank 26 is mounted on the upper end of a vertical shaft 27, and the operating relation is such that the back and forth oscillations of the flag rods 18 and 19 impart a uni-directional rotation to the vertical shaft 27. The lower end of shaft 27 has support in a bearing mounted on the gallery table 16, and the upper portion of the shaft has bearing support just below the tangent wrist arm 26 in an angular bracket 28 extending upwardly from the gallery table. Mounted on the lower portion of this vertical shaft 27 is the conventional crank mechanism operating the conventional slide valves 29 governing the gas flow through the bellows. Mounted on the upper portion of the vertical shaft 27 is the conventional worm 29 which meshes with a worm wheel 31 mounted on a forwardly extending horizontal shaft 32, commonly referred to as the proving circle axle. The rear end of this proving circle shaft is journaled in a bearing bracket 33, and the front end of said shaft is operatively connected with the main indicating index or register 34 generally mounted in the front wall of the meter housing. All of the foregoing constitutes conventional well-known construction in the gas meter art. Our remote indicating register is arranged to derive operating energy from the above described mechanism of the gas meter, preferably through a gear drive which meshes with and is driven by the worm wheel 31. Our pulse transmitting unit, designated 40 in its entirety, is mounted within the gallery space 15 and is secured to the gallery table 16 and also to the side wall 14. When such transmitter unit is to be installed in a previously built meter which has been returned to the public utility company shop for such installation, the meter top 14 is, of course, first removed, and then the flag arm links 23 and 24 are disconnected from the wrist pin 25 and swung out of the way to permit the transmitter unit 40 to be mounted on the gallery deck 16 with its gear system meshing with the proving axle gear 31, as will be later described. Following such mounting of the transmitter unit on the gallery deck 16, the flag arm links 23 and 24 are reconnected to the wrist pin 25.

Referring now to Figure 2, the transmitter unit 40 comprises a vertical frame plate or bracket 41 having an angularly bent supporting foot 42 adapted to be secured to the top of the gallery deck 16, and another foot 42' adapted to engage the deck. In addition, a supporting wire 43 carried by the unit is adapted to have its ends soldered to the meter, as will be later described. Rotatably supported in the transmitter unit assembly 40 is a horizontally extending shaft 44 carrying a gear 45 which meshes with the worm wheel 31 to be driven thereby. The rear end of the shaft 44 is journaled in a bearing 44a in the vertical supporting plate 41, and the front end of said shaft is journaled in a bearing 44b carried by an extension of the diaphragm housing cover (Figure 1), as will be later described. Driven through the gear 45 is a train of reduction gearing comprising a pinion 47 mounted on the rear end of the shaft 44 and meshing with a large gear 48 which is pivotally mounted on a stub shaft 49 projecting forwardly from the frame plate 41. Rotating with the large gear 48 is a pinion 51 which drives a large gear 52 rotatably mounted on another stub shaft 53 projecting forwardly from the vertical frame plate 41, the latter gear 52 being shown as having a shrouding flange 52' on its front side. This large gear 52 carries a large spiral cam 55 on its front face, this cam preferably being formed integral with the gear 52. Said cam has an inner point of minimum radius 56 from which the cam spirals outwardly to a point of maximum radius 57, these two points of minimum and maximum radius being joined by a substantially radial drop-off shoulder 58. The cam has a clockwise direction of rotation, as indicated by the arrow in Figure 2, and responding thereto is a cam follower roller 61 carried by a diaphragm actuator 62. We prefer to mold the gears 45, 48, 51, 52, the cam 55 and the follower roller 61 from a suitable plastic material. This reduces the cost of these parts.

The upper end of the diaphragm actuating head 62 is secured by a screw 63 to a diaphragm 64 operating in a horizontally disposed pulse transmitting chamber 65. As shown in Figure 4, this diaphragm actuator 62 is an inverted U-shaped stamping having spaced side walls 62', 62' between the lower ends of which is mounted the cam follower roller 61. The movement of the diaphragm actuator 62 is guided by a parallel link system comprising upper and lower parallel links 67 and 68. The swinging ends of these links have pivotal connection with the diaphragm actuator through upper and lower pivots 71 and 72, and the opposite ends of said links have mounting on stationary pivot axes 73 and 74 carried by the supporting frame 41. The upper link 67 has U-shaped notches 75 and 76 extending upwardly from its lower edge at opposite ends of the link for engaging down over the swinging and stationary pivots 71 and 73 of this link. A relatively heavy tension spring 77 has a hook-shaped upper end 78 which is hooked through an aperture 79 in this upper link 67, the lower end of said spring having a hook 81 which is engaged under a lug 82 projecting laterally from the supporting frame plate 41. This tension spring holds the follower roller 61 pressed downwardly against the periphery of the cam 55, and causes a relatively abrupt downward movement of the diaphragm actuator and diaphragm when the follower roller 61 rides off the drop-off shoulder 58 of the cam. In addition, this spring 77 holds the notches 75 and 76 engaging down over the pivots 71 and 73.

As shown in Figure 3, the vertical frame plate 41 is formed with a bearing bracket extension 84 provided with a laterally spaced downwardly extending arm 85. The stationary pivot 73 for the upper mounting link 67 consists of a reduced portion formed in a bearing pin 86 carried by the bearing bracket 84. This gearing pin has cylindrical shank portions 87, 87' of larger diameter to each side of the pivot portion 73, and has left and right hand bearing extremities 88 and 89 of reduced diameter. The left hand bearing extension 88 seats in the bottom of a straight-sided vertical slot 91 formed in the frame plate 41, this slot being narrower than the enlarged portion 87 of the bearing pin. The right hand bearing extension 89 seats in the narrow bottom of a key hole slot 92 formed in the bracket arm 85. As shown in Figure 2, this key hole slot has a large diameter upper portion 92' capable of passing the enlarged shank portion 87, 87' of the bearing pin 86. This construction greatly simplifies the assembly operation; viz. the bearing pin 86 is passed endwise into the bearing bracket through the large opening 92' of the key-hole slot, and the bearing extremities 88 and 89 are then seated in the narrower slot seats 91 and 92; following which the upper mounting link 67 is placed down over the pivots 71 and 73 and the tension spring 77 connected thereto, this spring serving to hold the bearing pin ends down in the bottoms of their respective slots 91, 92 where the bearing pin is held against axial displacement.

The lower swinging link 68 has its swinging end bent laterally to pass through apertures in the actuator side arms 62' and through the cam follower roller 61, as shown in Figure 4, whereby this laterally bent end of the link constitutes the pivot 72 for the roller 61. The opposite end of said lower link 68 is also bent laterally to form the pintle portion 74 which extends through aligned apertures 95 in the bracket arm and frame plate. As shown in Figure 3, the upper hook-shaped end 78 of the tension spring 77, after being inserted through the upper link aperture 79, is passed down on the outer side of the lower link 68 to bear against this lower link and hold it in place. The pin 71 for the swinging end of the upper link (Figure 4) is suitably staked or sprung into position in the actuator side arms 62'; and as also shown in Figure 4, the rear edges of these arms may be provided with inwardly deflected wings 62" to hold this upper link 67 in its properly centered erect position.

Referring now to the diaphragm chamber 65, this comprises a chamber cover 101 formed with a peripheral clamping flange 102 which cooperates with a lower clamping ring 103, between which the peripheral portion of the diaphragm 64 is clamped by the screws 104.

The lower clamping ring 103 of the diaphragm chamber is open at its center to permit the diaphragm to flex downwardly therethrough. The diaphragm chamber has fixed mounting on the upper portion of the frame plate 41 at three different points, viz. by the screw 104a (Figure 2) passing down through laterally bent lug 105 at the right hand end of the frame plate; by screw 104b passing down through the frame bracket extension 84 at the left hand side of the frame, and by the screw 104c (Figure 3) passing down through a diagonal bracket arm 106 projecting outwardly form the central portion of the frame plate 41. The central portion of the diaphragm 64, which is preferably composed of rubber, neoprene, or the like over a base fabric of Orlon or nylon, is reinforced by upper and lower sheet metal backing disks 107, 108. The attaching screw 63 which joins the actuator 62 to the diaphragm passes down through these backing disks and through the diaphragm and threads into a tapped hole in the upper portion of the actuating yoke 62.

It will be seen from Figure 1 that the horizontally disposed diaphragm chamber 65 lies below the plane of operating movement of the flag arms 21, 22 and their associated links 23 and 24. The horizontal disposal of the diaphragm chamber permits the use of a relatively large diaphragm, which is advantageous for obtaining a distinct operating pulse, while still keeping the over all height of the transmitter unit 40 to a minimum, so that it can be readily installed beneath the operating plane of the flag arms and links of the conventional meter. In this same regard, the parallel link mounting 67, 68 of the diaphragm actuator 62 also cooperates in reducing the over all height of the assembly by avoiding the necessity of bearing guides for the diaphragm actuator; this parallel link mounting also sustaining, with less friction, the lateral component which the cam 55 exerts against the cam follower roller 61. The flexibility of the diaphragm 64 readily accommodates the very slight arcuate movement given to the diaphragm actuator 62 by the parallel links 67, 68. When the cam 55 reaches the drop-off point approximately illustrated in dotted lines, the downward movement of the cam follower roller 61 is relatively abrupt, the back lash in the speed reducing gear train permitting the roller 61 to complete its downward movement relatively quickly, once this roller has started down the drop-off shoulder 58.

Opening into the upper portion of the diaphragm chamber 65 is a spring closed valve 111 which is arranged to be actuated into its open position by the diaphragm as the latter approaches the upper limit of its movement. This valve comprises the head portion carrying a pliable sealing gasket 112, which is adapted to engage a valve seat 114 formed at the upper end of a tubular bushing 115 anchored in the top of the diaphragm chamber cover 101. The valve 111 has a hollow stem portion 116 which passes down loosely through the guide bushing 115, and mounted in this tubular stem is a compression spring 117 which normally tends to hold the valve seated in its closed position. The upper end of the spring 117 reacts against the under side of a releasable spring retainer 118 having three downwardly extending spring arms 119 having inwardly bent lower ends adapted to snap into a retaining groove 121 formed in the base portion of the guide bushing 115. As the diaphragm 64 approaches the upper limit of its movement, the head 63' of the diaphragm clamping screw 63 engages the lower end of the valve stem 116 and pushes the valve upwardly to the open position illustrated in Figure 2. In that embodiment of our invention which uses the metered illuminating gas as the pulse transmitting medium, such opening of the valve 111 admits illuminating gas from the gallery chamber 16 into the diaphragm chamber 65 and into the pulse transmitting system extending to the outdoor indicator. The opening of such valve at the top of the diaphragm stroke insures that there will be an adequate amount of pulse transmitting fluid in the system to transmit the rarefaction pulse to the outdoor indicator, which rarefaction pulse is creased by the abrupt downward movement of the diaphragm when the roller 61 rides over the drop-off shoulder of the cam. The valve 11 closes very early in this abrupt downward movement of the diaphragm, so that the major portion of the diaphragm stroke is effective for creating the rarefaction pulse in the pulse transmitting system. In the modified embodiment of our invention utilizing atmospheric air as the pulse transmitting medium, the opening of the valve 111 is arranged to admit atmospheric air into the diaphragm chamber instead of illuminating gas, as will be later described.

Leading from the upper portion of the diaphragm chamber 65 is a coiled length of ductile tubing 125, such as copper tubing, which extends to a compression fitting 126 which passes out through a hole 127 in the side wall of the gallery chamber 15. A flange 128 on the inner portion of this compression fitting 126 is soldered to the inside of the meter wall. A compression nut 129 and internal sleeve establish coupling engagement over the compression fitting 126c and connect with the length of pulse transmitting tubing 131 which extends to the outdoor indicator, to be later described.

Referring again to the manner in which our improved transmitter unit 40 has been designed to meet the space limitations within the gallery chamber 15, it will be seen from Figure 3 that the transmitter unit is arranged to straddle the gas inlet channel 17 which leads from the gas inlet conduit 12 to the measuring bellows. This gas inlet channel 17 extends considerably above the level of the gallery deck 16, and the transmitter unit 40 has been designed so that a substantial part of the diaphragm chamber extends over the inlet channel, and the major portion of the reduction gearing, together with the cam and diaphragm actuator, etc. are disposed to one side of this inlet channel 17. The previously mentioned supporting wire or rod 43 has attachment to that edge of the diaphragm chamber which overhangs the inlet channel, and establishes a supporting leg extending down from the diaphragm chamber to the gallery deck at a point beyond the inlet channel. As shown in Figure 3, this supporting rod comprises a horizontally bent portion 43b which passes under the rim portion of the diaphragm chamber and is adjustably secured thereto by the U-shaped clamp 136. The adjacent screw 104d threads through a tapped hole in the bottom leg of this clamp and serves to pull this leg upwardly against the under side of the wire portion 43b. One end of this supporting wire or rod extends downwardly as a vertical supporting leg 43c, which is adapted to be soldered to the gallery deck 16, as indicated at 137. The other end 43d of this supporting rod extends horizontally and is adapted to be bent into abutment against the side wall of the gallery chamber and to be soldered thereto at 138, as shown in Figure 1. By loosening the clamp 136, relative shifting adjustment can be effected between the transmitter unit 40 and this supporting rod 43, so as to establish proper relationship between the transmitter unit and supporting rod prior to soldering the ends of the rod to the meter.

In that embodiment of our invention which utilizes the illuminating gas as the pulse transmitting medium, it is desirable that the gas pressure in the gallery chamber 15 be substantially equal to the line pressure of the gas. On closed top meters, leakage through stuffing box glands will usually bring the gallery chamber pressure to some level practically equal to gas line pressure. However, it is recommended that a small hole 139 (comparable to a #60 drill) be drilled through the gallery table 16 in one of the diaphragm compartments. By so doing, positive pressure will always exist in the gallery chamber, thus assuring correct operation of the telemeter system when using gas as the pulse transmitting medium.

Figures 5, 6, 8:
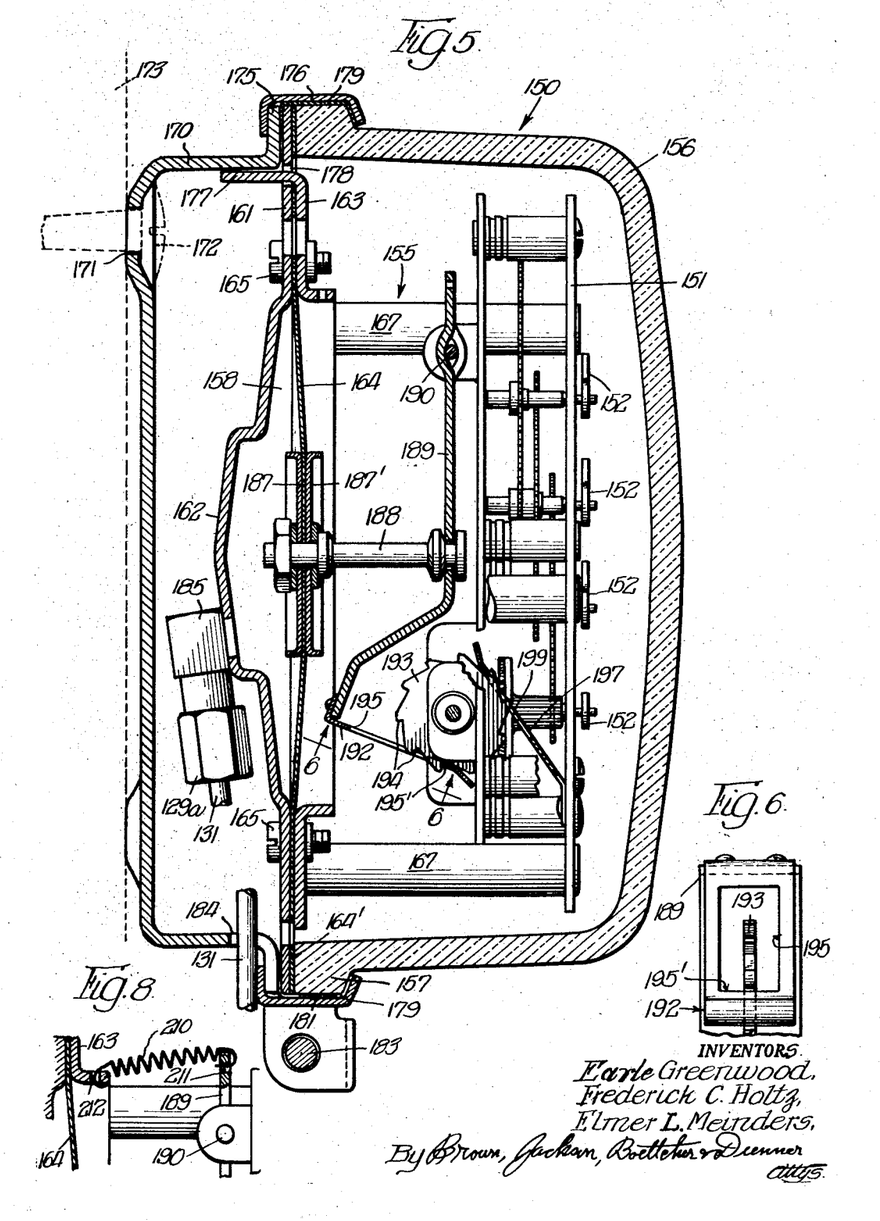
Figure 5 is a side view of the outdoor indicating register, illustrating in section the pulse receiving diaphragm chamber that responds to the fluid pulses sent from the pulse transmitter.
Figure 6 is a detail view taken approximately on the plane of the line 6—6 of Figure 5 illustrating the stepping or advancing mechanism of the outdoor indicator.
Figure 8 is a fragmentary detail view showing one preferred modification which may be added to the outdoor indicator when using atmospheric air as the pulse transmitting medium.

Referring now to the outdoor indicator or receiver, designated 150 in its entirety, this device is adapted to be located at any suitable point on the outside of the house or building, where it will be of convenient access to the meter reader, but as close as practicable to the inside meter 10. As shown in Figure 1A, this outdoor receiver or indicator comprises a main dial plate 151 on which are mounted a series of totalizing indicating pointers 152 cooperating with numbered dials 153, designating hundreds, thousands, ten thousands and hundred thousands cubic feet of gas, corresponding to the same readings appearing on the main indicating register or index 34 of the inside gas meter 10. Referring to Figure 5, which shows this outdoor unit in enlarged section, the dial plate 151 and totalizing pointers 152 constitute part of a mechanism unit 155 which includes the diaphragm chamber, diaphragm, stepping ratchet, ratchet wheel, carry-over gearing between the indicating pointers, etc. This mechanism unit 155 is closed on the front side by the glass cover 156 having a seating rim or flange 157 at its rear edge. The diaphragm chamber 158 which receives the fluid stepping pulses from the transmitter unit 40 through conduit 131, comprises a circular rear plate 161 having a rearwardly dished central portion 162. Cooperating with this rear plate 161 is a front plate or clamping ring 163, and between these two members 161 and 163 is clamped the diaphragm 164, preferably composed of rubber, neoprene, or the like over a base fabric of Orlon or nylon. The rear plate 161 and the front clamping rim 163 are fastened together by a plurality of cap screws 165 passing through the rear plate and threading into tapped bosses punched forwardly from the clamping rim 163. Spacer posts 167 have their front ends riveted to the dial plate 151 and have their rear ends secured to the diaphragm housing assembly 161, 163 by cap screws or the like, whereby the diaphragm housing assembly functions as a supporting frame plate for mounting the mechanism of the mechanism unit 155.

This outdoor indicating unit 150 is adapted to be mounted on the outside of the house or building through the medium of a mounting cup 170 provided with a plurality of internal apertures 171 for receiving inside screws, bolts or the like 172 extending into the supporting wall 173 of the house or building. When the receiver unit is assembled on this mounting cup 170, the fastening screws or bolts 172 are inaccessible to unauthorized access. The mounting cup 170 has an outwardly extending front flange 175 against which the mechanism unit and cover glass are adapted to be held by a clamping band 176. The proper centering of the diaphragm chamber assembly 161, 163 with respect to this mounting cup is assured by providing guide tongues 177 at angularly spaced points around the periphery of the clamping rim 163, which guide lugs are projected rearwardly through openings 178 in the diaphragm housing plate 161, so that these lugs function as centering guides in entering the cup 170.

The clamping flange 157 of the glass cover 156 is adapted to be clamped to the outer side of the diaphragm housing plate 161 by an inner clamping or sealing band 179 which embraces the forward surface of the flange 157 and the rear edge of the plate 161. The two ends of this inner sealing band 179 are adapted to be connected by a thin metallic sealing strap 181 which is adapted to have one end inserted outwardly through a slot in one end of the sealing band 179 and then bent over, and which is adapted to have its other end similarly passed outwardly through a slot in the other end of the sealing band 179 and then bent over. This sealing strap 181 enables the two ends of the sealing band 179 to be drawn toward each other for obtaining the snug fit of the band 179, before the ends of the strap 181 are bent over to hold the band 179 in place. The peripheral portion of the diaphragm 164 is extended outwardly to function as a cushioning gasket 164′ between the rear surface of the glass cover and the forward surface of the metal frame plate 161. After the mounting cup 170 has been stationarily secured to the supporting surface 173, and after the pulse transmitting conduit 131 has been connected to the diaphragm chamber 158, the sub-assembly comprising the mechanism unit 155 and the glass cover 156 (joined together by the inner sealing band 179) is mounted on the mounting cup 170 and is secured thereto by the outer sealing band 176. This outer sealing band embraces the front surface of the glass cover clamping flange 157 and embraces the back surface of the mounting cup flange 175. The two ends of this outer sealing band 176 are adapted to be drawn together by any conventional form of removable sealing screw 183, preferably of the type accommodating the lead seal of the utility company, or pad lock or other tamper-proof sealing instrumentality.

The length of pulse transmitting copper tubing 131 enters the mounting cup 170 through a slot 184 located at any convenient point in the wall of the cup. The tubing is given a complete or partial loop within the mounting cup, for the purpose of flexibility, and has its end connected with the interior of the diaphragm chamber 158 through a coupling 185 and through a compression nut 129a and internal sleeve, similarly to the connection employed at the transmitter end of the tubing.

The diaphragm 164 carries inner and outer diaphragm cups or disks 187, 187' which mount an actuating stem or spindle 188. The latter stem or spindle passes through an aperture formed at an intermediate point in an advancing lever 189 which has one end pivoted on a stationary pivot pin 190 carried by the mechanism unit. The other end of this stepping lever 189 has a flexible reed type of advancing pawl 192 riveted, or otherwise secured thereto. This advancing pawl may consist of a very thin strip of beryllium copper or the like, spring tempered to have flexing engagement over the teeth of a ratchet wheel 193. As shown in Figure 6, this spring strip advancing pawl has a rectangular opening 195 formed therein which embraces the adjacent periphery of the ratchet wheel 193. The far edge 195' of this rectangular opening is adapted to have step-by-step ratcheting engagement with the right angle shoulders 194 of the ratchet wheel 193. Thus, with the transmission of each rarification pulse from the transmitting unit 40 to the diaphragm chamber 163, the resulting inward flexure of the diaphragm 164 operates through lever 189 and advancing pawl 192 to transmit a one step advancement to the ratchet wheel 193. This ratchet wheel is connected with the rotating indexing arrows of the indicator dial through any conventional form of gearing. The ratchet wheel 193 is held against reverse rotation, during the retracting movement of the advancing pawl 192, by a holding pawl 197 which is also of this same flexible reed type. That is to say, this holding pawl similarly comprises a thin strip of spring tempered beryllium copper or the like having one end anchored to the mechanism unit and having a rectangular slot 199 in its other end embracing the ratchet wheel, the far end of this rectangular opening cooperating with the ratchet wheel teeth to prevent reverse rotation of the ratchet wheel.

It will be understood that atmospheric pressure prevails on the inner side of the glass cover of the outdoor indicating unit and is effective on the outer or right hand surface of the diaphragm 164. When the valve 111 of the transmitter unit 40 is opened at the top of the stroke of the transmitter diaphragm, the gas pressure prevailing in the gallery chamber 15 is transmitted to the diaphragm chamber of the receiver unit, so that the diaphragm 164 normally occupies an outwardly flexed position. The transmission of the rarification pulse from the transmitter unit quickly draws the diaphragm 164 inwardly toward the left, for imparting a stepping advancement to the ratchet wheel 193 and totalizing counters.

Figure 7:
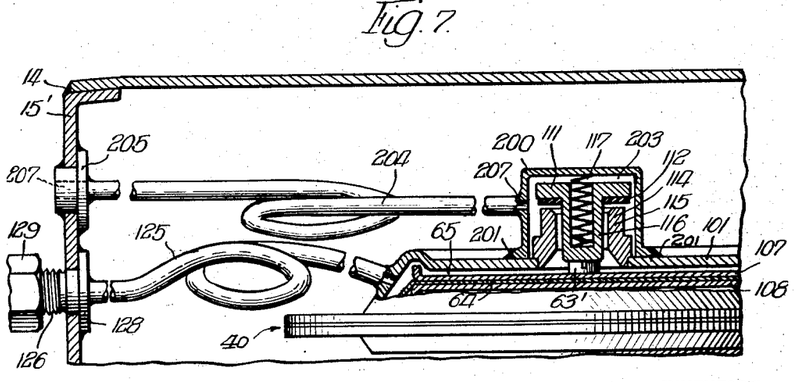
Figure 7 is a fragmentary view of the upper portion of our improved pulse transmitter modified and arranged to employ air as the pulse transmitting medium.

Referring now to the modified embodiment of our invention wherein we employ atmospheric air as the pulse transmitting medium, attention is now directed to Figure 7 which illustrates how the transmitter unit 40 is modified to effect this use of atmospheric air. Instead of the open valve cage 118 for sustaining the pressure of the valve spring 117, we now completely enclose the valve assembly by a cup-shaped closure cap 200 which completely encloses the valve 111 and the tubular guide bushing 115. The lower edge of this cup-shaped enclosure 200 is soldered to the top of the diaphragm housing cover 101 at 201, so as to establish a valve chamber 203 which hermetically seals the valve 111 and the diaphragm chamber 65 from the gas prevailing in the gallery chamber 15. Extending from the closure cup 200 at any suitable point is a conduit or section of tubing 204 leading to any suitable point of connection with the atmosphere exterior of the gas meter. For example, this section of atmospheric venting tubing 204 may be connected with a coupling or fitting 205 which is soldered in an opening in one of the side walls 15' of the gallery chamber. This section of tubing 204 and fitting 205 establish an atmospheric passageway 207 leading into the valve chamber 203, so that atmospheric, or approximate atmospheric pressure, prevails at all times in this valve chamber 203. Hence, when the valve 111 is opened at the top of the stroke of the transmitter diaphragm 64, the pulse transmitting system is pressurized by admitting atmospheric pressure into the transmitter diaphragm chamber 65 and through the tubing 131 to the diaphragm chamber of the outdoor receiver unit. Thus, during the normal, non-pulsing intervals in the system, the same atmospheric pressures will prevail upon opposite sides of the receiver unit diaphragm 164. When the transmitter unit transmits its rarification pulse to the receiver unit, the reduced pressure then acting on the inner side of the diaphragm 164 results in this diaphragm being drawn inwardly for transmitting a stepping actuation to the ratchet wheel 193.

When thus using atmospheric air as the pulse transmitting medium, it may be desirable to place a slight spring bias on the diaphragm 164 of the outdoor receiving unit. The purpose of such spring bias is to insure that the diaphragm will move outwardly to its fully retracted outward position upon the cessation of the rarification pulse. In Figure 8 we have illustrated the use of a light tension spring 210 connected to that end of the advancing lever 189 projecting beyond its mounting pivot. One end of this tension spring 210 is hooked into an aperture 211 in this end of the advancing lever 189, and the other end of said tension spring is hooked into an aperture 212 formed in the inner rim of the clamping plate 163. This tension spring 210 insures that the diaphragm 164 will be flexed outwardly to its normal outer position immediately upon cessation of the rarification pulse from the transmitter unit. It will be understood that any suitable tamper-proof seals may be connected with the coupling nuts 129 and 129a, so as to prevent the unauthorized disconnection of either end of the pulse transmitting tube 131.

While we have illustrated and described what we regard to be the preferred embodiments of our invention, nevertheless it will be understood that such are merely exemplary and that numerous modifications and rearrangements may be made therein without departing from the essence of the invention.

We claim:

1. In a pulse transmitter for transmitting pulses pursuant to the operation of a driven member, the combination of a diaphragm chamber containing a gaseous fluid, a diaphragm mounted therein, a spiral cam connected to be rotated by said driven member, said cam having a gradually sloping cam rise terminating in an abrupt drop-off shoulder, a diaphragm actuating head operatively connected to said diaphragm, a cam following roller on said head having rolling engagement on the peripheral cam rise of said cam, a pair of substantially parallel links having non-swinging ends pivotally mounted on fixed pivot axes and having swinging ends pivotally connected with said diaphragm actuating head on swinging pivot axes, and spring means holding the follower roller of said actuating head pressed against said cam, said spring means having energy stored therein in the outward movement of said diaphragm actuating head pursuant to the slow rotation of said cam, which energy is suddenly released when the follower roller rides off the drop-off shoulder of said cam for giving an abrupt flexure to said diaphragm, such abrupt flexure transmitting an actuating pulse through the gaseous fluid contained in said diaphragm chamber.

2. In a fluid pulse transmitting system for transmitting fluid pulses pursuant to the operation of a driven member, the combination of a diaphragm chamber containing a gaseous fluid, a diaphragm mounted therein, a spiral cam connected to be rotated by said driven member, said cam having a gradually sloping cam rise terminating in an abrupt drop-off shoulder, a diaphragm actuating head operatively connected to said diaphragm, a cam following roller on said head having rolling engagement on the peripheral cam rise of said cam, a pair of substantially parallel links having non-swinging ends pivotally mounted on fixed pivot axes and having swinging ends pivotally connected with said diaphragm actuating head on swinging pivot axes, spring means holding the follower roller of said actuating head pressed against said cam, said spring means having energy stored therein in the outward movement of said diaphragm actuating head pursuant to the slow rotation of said cam, which energy is suddenly released when the follower roller rides off the drop-off shoulder of said cam for giving an abrupt flexure to said diaphragm, such abrupt flexure transmitting an actuating pulse through the fluid contained in said diaphragm chamber, and means for admitting a gaseous fluid from an external source to said fluid pulse transmitting system.

3. In a fluid pulse transmitting system for transmitting fluid pulses pursuant to the operation of a driven member, the combination of a diaphragm chamber, a diaphragm therein, a pulse transmitting conduit leading from said diaphragm chamber, a spiral cam adapted for connection to said driven member to be driven thereby at relatively slow speeds, said cam having a gradually sloping cam rise terminating in an abrupt drop-off shoulder, a diaphragm actuating head operatively connected to said diaphragm, a cam following roller on said head having rolling engagement on the peripheral cam rise of said cam, a pair of substantially parallel links having non-swinging ends pivotally mounted on fixed pivot axes and having swinging ends pivotally connected with said diaphragm actuating head on swinging pivot axes, spring means holding the follower roller of said actuating head pressed against said cam, said spring means having energy stored therein in the outward movement of said diaphragm actuating head pursuant to the slow rotation of said cam, which energy is suddenly released when the follower roller rides off the drop-off shoulder of said cam for giving an abrupt flexure to said diaphragm, such abrupt flexure transmitting an actuating pulse through the fluid contained in said conduit, and means for admitting atmospheric air to said fluid pulse transmitting system.

4. In a fluid pulse transmitter for transmitting fluid pulses pursuant to the operation of a driven member, the combination of a diaphragm chamber containing a gaseous fluid, a diaphragm mounted therein, a pulse transmitting conduit leading from said diaphragm chamber, an actuating head connected to said diaphragm, a cam follower roller carried by said actuating head, a spiral cam connected to be driven by said driven member at speeds proportional to the rate of operation of said driven member, said cam having a gradually sloping cam rise terminating in an abrupt drop-off shoulder, said cam follower roller riding on said cam, and spring means holding said follower roller pressed against said cam, said spring means having energy stored therein in the outward movement of said diaphragm actuating head pursuant to the slow rotation of said cam, which energy is suddenly released when the follower roller rides off the drop-off shoulder of said cam for giving an abrupt flexure to said diaphragm, such abrupt flexure transmitting an actuating pulse through the fluid contained in said conduit.

5. In pulse transmitting apparatus for a gas meter of the class described provided with a gallery chamber in which flag arms and links transmit operating motion from the measuring bellows to the registering mechanism of the meter, the combination of a fluid pulse transmitter mounted in said gallery chamber substantially below the plane of said flag arms and links, said pulse transmitter comprising a transmitter chamber having a substantially horizontally disposed movable wall therein, and actuating means responsive to the motion of said flag arms and links for actuating said movable wall substantially vertically with a relatively slow motion in one direction and a relatively abrupt motion in the other direction.

6. In pulse transmitting apparatus for a gas meter of the class described provided with a gallery chamber in which flag arms and links transmit operating motion from the measuring bellows to the registering mechanism of the meter, the combination of a pulse transmitting diaphragm chamber mounted substantially horizontally in said gallery chamber approximately below the plane of operation of said flag arms and links, a fluid conduit extending through a wall of said gallery chamber and connecting with said pulse transmitting diaphragm chamber, a diaphragm hermetically sealing the under side of said pulse transmitting chamber, an actuating cam disposed below said diaphragm chamber, means for transmitting motion from said flag arms and links to said actuating cam, and means responsive to said cam for imparting a relatively slow flexure to said diaphragm in one direction and a relatively abrupt flexure to said diaphragm in the opposite direction.

7. In pulse transmitting apparatus for a gas meter of the class described wherein a gallery table defines a gallery chamber in the upper portion of said meter, and wherein a gas inlet channel extends through said gallery chamber above the level of said gallery table and wherein flag arms and links disposed in said gallery chamber transmit operating motion from the measuring bellows of the meter to the registering mechanism thereof, the combination of a pulse transmitting diaphragm chamber disposed substantially horizontally in said gallery chamber above the top of said gas inlet channel and below the operating plane of said flag arms and links, a diaphragm hermetically sealing the under side of said diaphragm chamber, cam means mounted to rotate on a substantially horizontal axis below said diaphragm chamber, motion transmitting mechanism comprising speed reducing gearing for transmitting motion from said flag arms and links to said cam means, said cam means and speed reducing gearing being disposed to one side of said gas inlet channel, and means responsive to said cam means for causing said diaphragm to be operated through a cycle comprising a relatively slow upward flexure of the diaphragm and a relatively abrupt downward flexure of the diaphragm, said cyclical operation occurring at a rate proportional to the rate of the gas flow through the meter.

8. In pulse transmitting apparatus for a gas meter of the class described wherein a gallery table defines a gallery chamber in the upper portion of said meter, and wherein a gas inlet channel extends through said gallery chamber above the level of said gallery table and wherein flag arms and links disposed in said gallery chamber transmit operating motion from the measuring bellows of the meter to the registering mechanism thereof, the combination of a pulse transmitting diaphragm chamber disposed substantially horizontally in said gallery chamber above the top of said gas inlet channel and below the operating plane of said flag arms and links, a diaphragm heremetically sealing the under side of said diaphragm chamber, cam means mounted to rotate on a substantially horizontal axis below said diaphragm chamber, motion transmitting mechanism comprising gearing for transmitting motion from said flag arms and links to said cam means, means responsive to said cam means for causing said diaphragm to be operated through a cycle comprising a relatively slow upward flexure of the diaphragm and a relatively abrupt downward flexure of the diaphragm, said cyclical operation occurring at a rate proportional to the rate of the gas flow through the meter, a supporting frame for said diaphragm chamber adapted to have attachment to said gallery deck on one side of said gas inlet channel, and supporting legs adjustably secured to said supporting frame and adapted to have attachment to said gallery deck at the other side of said gas inlet channel and also to the side wall of said gallery channel.

9. In a fluid pulse transmitter for transmitting fluid pulses pursuant to the operation of a driven member, the combination of a supporting frame, a diaphragm chamber carried by said frame, a diaphragm in said chamber, said diaphragm chamber containing a gaseous fluid, a diaphragm actuator adapted to actuate said diaphragm, a spiral cam having an abrupt drop-off shoulder adapted to operate said diaphragm actuator, means operatively connecting said cam with said driven member whereby said cam is rotated at a rate proportional to the rate of motion of said driven member, means for guiding the motion of said diaphragm actuator comprising a pair of substantially parallel links spaced one above the other in the plane of movement of said diaphragm actuator, a pair of spaced swinging pivots pivotally connecting the swinging ends of said parallel links with said diaphragm actuator, a pair of spaced non-swinging pivots pivotally connecting the opposite ends of said parallel links with said supporting frame, spring means connected to exert a downward pull on one of said parallel links for causing the abrupt pulsing flexure of said diaphragm when said diaphragm actuator drops off the drop-off shoulder of said cam, said latter link having notches in its lower edge seating over its respective swinging and non-swinging pivots and maintained in engagement therewith by the tension of said spring.

10. In a fluid pulse transmitter for transmitting fluid pulses pursuant to the operation of a driven member, the combination of a supporting frame, a diaphragm chamber carried by said frame, a diaphragm in said chamber, said diaphragm chamber containing a gaseous fluid, a diaphragm actuator adapted to actuate said diaphragm, a spiral cam having an abrupt drop-off shoulder adapted to operate said diaphragm actuator, means operatively connecting said cam with said driven member whereby said cam is rotated at a rate proportional to the rate of motion of said driven member, means for guiding the motion of said diaphragm actuator comprising a pair of substantially parallel links spaced one above the other in the plane of movement of said diaphragm actuator, a pair of spaced swinging pivots pivotally connecting the swinging ends of said parallel links with said diaphragm actuator, a pair of spaced non-swinging pivots pivotally connecting the opposite ends of said parallel links with said supporting frame, spring means operatively connected with one of said links tending to cause abrupt pulsing flexure of said diaphragm when said diaphragm actuator drops off the drop-off shoulder of said cam, one of the pivots for said latter link comprising a pin having a relatively large diameter shank portion and a relatively small diameter end portion, and bearing means for said pivot pin comprising a key-hole slot through the large end of which said shank portion can pass and in the narrow end of which said end portion is adapted to have normal seating engagement, the action of said spring on said latter link holding the small diameter end portion of said pivot pin in the narrow end of said key-hole slot.

11. In a fluid pulse transmitter for transmitting fluid pulses pursuant to the operation of a driven member, the combination of a supporting frame, a diaphragm chamber carried by said frame, a diaphragm in said chamber, said diaphragm chamber containing a gaseous fluid, a diaphragm actuator adapted to actuate said diaphragm, a spiral cam having an abrupt drop-off shoulder adapted to operate said diaphragm actuator, means operatively connecting said cam with said driven member whereby said cam is rotated at a rate proportional to the rate of motion of said member, means for guiding the motion of said diaphragm actuator comprising a pair of substantially parallel links spaced one above the other in the plane of movement of said diaphragm actuator, a pair of spaced swinging pivots pivotally connecting the swinging ends of said parallel links with said diaphragm actuator, a pair of spaced non-swinging pivots pivotally connecting the opposite ends of said parallel links with said supporting frame, a tension spring connected at one end with said supporting frame and connected at its other end with one of said links for normally exerting a downward pull on said diaphragm actuator so as to cause abrupt pulsing flexure of said diaphragm when said diaphragm actuator rides off the drop-off shoulder of said cam, said latter parallel link having notches therein which are maintained in assembled relation over its respective swinging and non-swinging pivots by the tension of said spring, the other of said links having laterally bent ends constituting its respective swinging and non-swinging pivots, said laterally bent ends being insertable axially into their respective bearing apertures in said diaphragm actuator and said supporting frame, and an extension portion extending downwardly from the upper end of said tension spring and overlying the outer side of said last mentioned link for holding its laterally bent ends from displacement from the bearing apertures.

12. In remote indicating apparatus for a gas meter having mechanism for measuring gas flowing therethrough, the combination of a remote indicator adapted to be located relatively remotely from said gas meter, a pulse transmitting system of the fluid type for transmitting stepping pulses from said gas meter to said remote indicator, said pulse transmitting system comprising a pulse receiver at said remote indicator, means responsive to the reception of a fluid pulse at said pulse receiver for actuating said remote indicator, a fluid conduit extending from said pulse receiver to said gas meter, a pulse transmitter at said gas meter contained with the gallery chamber thereof and connected with said fluid conduit, said pulse transmitter comprising a movable wall, means actuated by the gas measuring mechanism of said gas meter for operating said movable wall, valve means carried by said pulse transmitter and arranged to be opened during the movement of the movable wall for pressurizing said pulse transmitting system, a chamber enclosing said valve means, and an atmospheric connection connecting the interior of said valve chamber with atmosphere whereby atmospheric air is admitted to said pulse transmitting system through said valve means during the pressurizing operation.

References Cited in the file of this patent

UNITED STATES PATENTS

| | | |
|---|---|---|
| 1,491,777 | Maury | Apr. 22, 1924 |
| 1,533,281 | Tautz | Apr. 14, 1925 |
| 2,015,374 | Baker | Sept. 24, 1935 |
| 2,553,842 | Bickel et al. | May 22, 1951 |
| 2,633,296 | Dufour | Mar. 31, 1953 |
| 2,645,904 | Bernardoni | July 21, 1953 |

FOREIGN PATENTS

| | | |
|---|---|---|
| 44,169 | France | Aug. 20, 1934 |
| 475,030 | Great Britain | Nov. 12, 1937 |